United States Patent [19]
Mou et al.

[11] Patent Number: 5,218,565
[45] Date of Patent: Jun. 8, 1993

[54] METHOD AND A CIRCUIT FOR ENCODING A DIGITAL SIGNAL TO DETERMINE THE SCALAR PRODUCT OF TWO VECTORS, AND CORRESPONDING DCT PROCESSING

[75] Inventors: Zhi-Jian Mou, Arcueil; Francis Jutand, Paris, both of France

[73] Assignee: France Telecom, France

[21] Appl. No.: 765,001

[22] Filed: Sep. 24, 1991

[30] Foreign Application Priority Data

Sep. 24, 1990 [FR] France .................. 90 11758

[51] Int. Cl.$^5$ ........................... G06F 15/347
[52] U.S. Cl. ..................... 364/750.5; 364/754
[58] Field of Search ............... 364/750.5, 736, 754

[56] References Cited

U.S. PATENT DOCUMENTS

| | | | |
|---|---|---|---|
| 4,573,136 | 2/1986 | Rossiter | 364/750.5 |
| 4,701,876 | 10/1987 | McCasny et al. | 364/750.5 |
| 4,736,335 | 4/1988 | Barkan | 364/750.5 |
| 4,884,232 | 11/1989 | Schlunt | 364/750.5 |
| 4,974,186 | 11/1990 | Duhamel et al. | 364/750.5 |
| 5,032,865 | 7/1991 | Schlunt | 364/750.5 |

OTHER PUBLICATIONS

Proceedings of the 8th, symposium on Computer Arithmetic, 19 mai 1987, Villa Olmo, Como, Italie, pp. 13-20; S. Smith et al.: "Synthesis of Area-Efficient VLSI Architectures for Vector and Matrix Multiplication".

Primary Examiner—David H. Malzahn
Attorney, Agent, or Firm—Larson and Taylor

[57] ABSTRACT

The invention relates to encoding a digital signal to determine the scalar product of two vectors. For two vectors of the same dimension p, one having dedicated components {ak} and the other having variable components {xk}, the scalar product value $$f(xk,ak) = \sum_{k=1}^{k=p} ak \cdot xk$$

is reduced to partial sums fi of binary variables xki, which binary variables take one of the values of the fixed components ak depending on the values of the xki having m possible values. Dedicated logic encoding makes it possible to take the variables xki and generate a plurality of bit level elementary partial sums fij for each bit of rank j in fi, having $2^m$ possible values, by varying the binary values akj of the bits of rank j. A two-dimensional interconnection matrix causes each rank j bit akj to correspond to a single value of the elementary partial sums fij, and together these bits define the corresponding partial sum fi. The invention is applicable to circuits for image processing or for data compression by the discrete cosine transform.

11 Claims, 9 Drawing Sheets

$$x = 2^{-1} \sum_{i=0, i \text{ even}}^{N-1} (-2x_i + x_{i+1} + x_{i+2}) 4^{-i}$$

$$f(x,a) = x \cdot a = 2^{-1} \sum_{i=0, i \text{ even}}^{N-1} (-2x_i + x_{i+1} + x_{i+2}) \cdot a \cdot 4^{-i}$$

$$f_i = (-2x_i + x_{i+1} + x_{i+2}) \cdot a$$

$$f_i = [(\overline{S_i} \cdot a_j + S_i \cdot d_j) N_i] \oplus C_i$$

with $$S_i = x_{i+1} \oplus x_{i+2}$$

$$N_i = \overline{x_i} \cdot \overline{x_{i+1}} \cdot \overline{x_{i+2}} + x_i \cdot x_{i+1} \cdot x_{i+2}$$

$$C_i = x_i$$

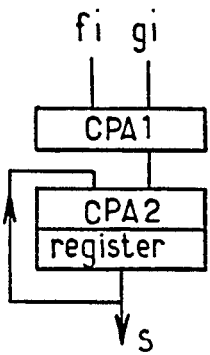
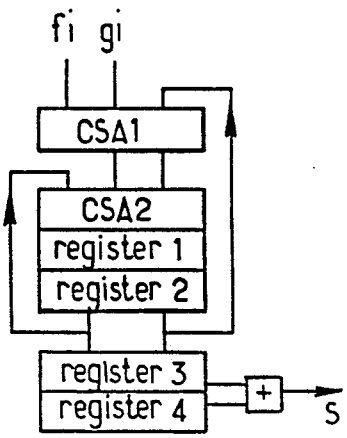
FIG. 3(a)
FIG. 3(b)
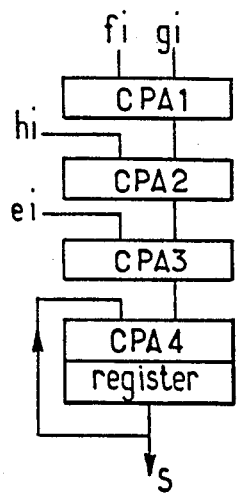
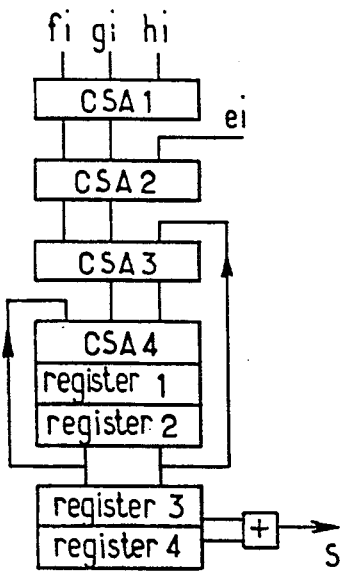
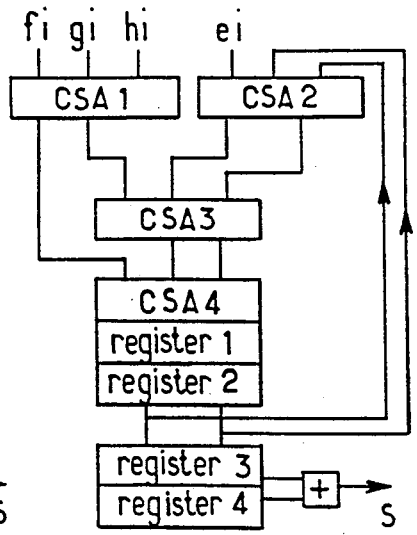
FIG. 3(c)
FIG. 3(d)
FIG. 3(e)

METHOD AND A CIRCUIT FOR ENCODING A DIGITAL SIGNAL TO DETERMINE THE SCALAR PRODUCT OF TWO VECTORS, AND CORRESPONDING DCT PROCESSING

The invention relates to a method and to a circuit for encoding a digital signal to determine the scalar product (or dot product) of two vectors.

BACKGROUND OF THE INVENTION

In present digital signal processing techniques, it is often necessary to perform vector scalar product and multiplication calculations, with one of the vectors being a constant, i.e. having determined dedicated components. It is recalled that for a vector of dimension p with dedicated components $\{ak\}_1^p$ and for a vector of arbitrary components $\{xk\}_1^p$, where the notation $\{ak\}_1^p$ and $\{xk\}_1^p$ is short for:

$$\{ak\}\begin{matrix}k=p\\k=1\end{matrix} \quad \text{and} \quad \{xk\}\begin{matrix}k=p\\k=1\end{matrix}$$

the value of the scalar product expressed in the form of a scalar product value function is written:

$$f(xk, ak) = \sum_{k=1}^{k=p} ak \cdot xk$$

When one of the vectors corresponds to a dedicated application, its components $\{ak\}$ correspond to dedicated components, i.e. to components of constant value in the application under consideration, and a corresponding encoding technique in accordance with the present invention can be implemented for calculating either a scalar product of the two vectors, or else a multiplication of the two vectors, where the operation of multiplying two vectors corresponds to performing a scalar product on two vectors of dimension p=1.

As appears on reading the description below, circuits for implementing the encoding method of the present invention are particularly simplified because of the said encoding technique.

SUMMARY OF THE INVENTION

The method of the present invention for encoding a digital signal to determine the scalar product of two vectors of the same dimension p and having dedicated components $\{ak\}_1^p$ and variable components $\{xk\}_1^p$ consists in expressing the scalar product value function $$f(xk, ak) = \sum_{k=1}^{k=p} ak \cdot xk$$

in the form of partial product sums fi of binary variables $\{xki\}$, with each partial product sum fi taking one of the fixed component values $\{ak\}$ depending on the values of said binary variables $\{xki\}$, having m possible values; then expressing each product partial sum fi at bit level into its bit level elementary partial sums fij for each bit of rank j, each elementary partial sum fij taking one of the values akj depending on the values of said binary variables $\{xki\}$. The bit level elementary partial sums fij are calculated by evaluating a plurality of $2^m$ possibilities by varying the binary values akj, thereby enabling each partial sum fi to be calculated on the basis of the bit level elementary partial sums fij, and even the value function of the scalar product.

In the circuit of the present invention for encoding a digital signal to determine the scalar product of two vectors having the same dimension p with dedicated components $\{ak\}_1^p$ and variable components $\{xk\}_1^p$ encoded on N bits, the value of the scalar product $$f(xk, ak) = \sum_{k=1}^{k=p} ak \cdot xk$$

is reduced to the form of partial sums fi of binary variables $\{xki\}$, each product partial sum fi taking one of the values of the fixed components ak depending on the values of said binary variables $\{xki\}$ having m possible values, and the circuit comprises dedicated logic encoding means for generating a plurality of bit level elementary partial sums fij for each bit of rank j of said partial sums fj and on the basis of said binary variables $\{xki\}$ by evaluating a plurality of $2^m$ possibilities by varying the binary values akj of said bits of the same rank j of the dedicated components $\{ak\}_1^p$ and; at least one two-dimensional matrix, said two-dimensional matrix causing each bit of rank j of the dedicated components ak to correspond to one value and one value only of the bit level elementary partial sums fij, the set of bit level elementary partial sums fij defining the corresponding partial sum fi.

The encoding method and circuit of the present invention are applicable in any type of processor for performing digital calculation, and in particular in processors for processing images digitally and in processors for compressing digital data by use of the Discrete Cosine Transform (DCT).

BRIEF DESCRIPTION OF THE DRAWINGS

Implementations and embodiments of the invention are described by way of example with reference to the accompanying drawings, in which:

FIGS. 3a, 3b, 3c, 3d, and 3e are block diagrams of circuits for combining two partial sums (FIGS. 3a and 3b) or four partial sums (FIGS. 3c, 3d, and 3e) fi, gi, hi, and ei relating to vectors resulting from two components, subassemblies or subvectors in a vector space of dimension p>2 where p is a multiple of two;

DETAILED DESCRIPTION

A more detailed description of the method of the present invention for encoding a digital signal for the purpose of determining the scalar product of two vectors is given below with reference to FIG. 1a, and then with reference to FIGS. 1b and 1c.

Figure 1A:
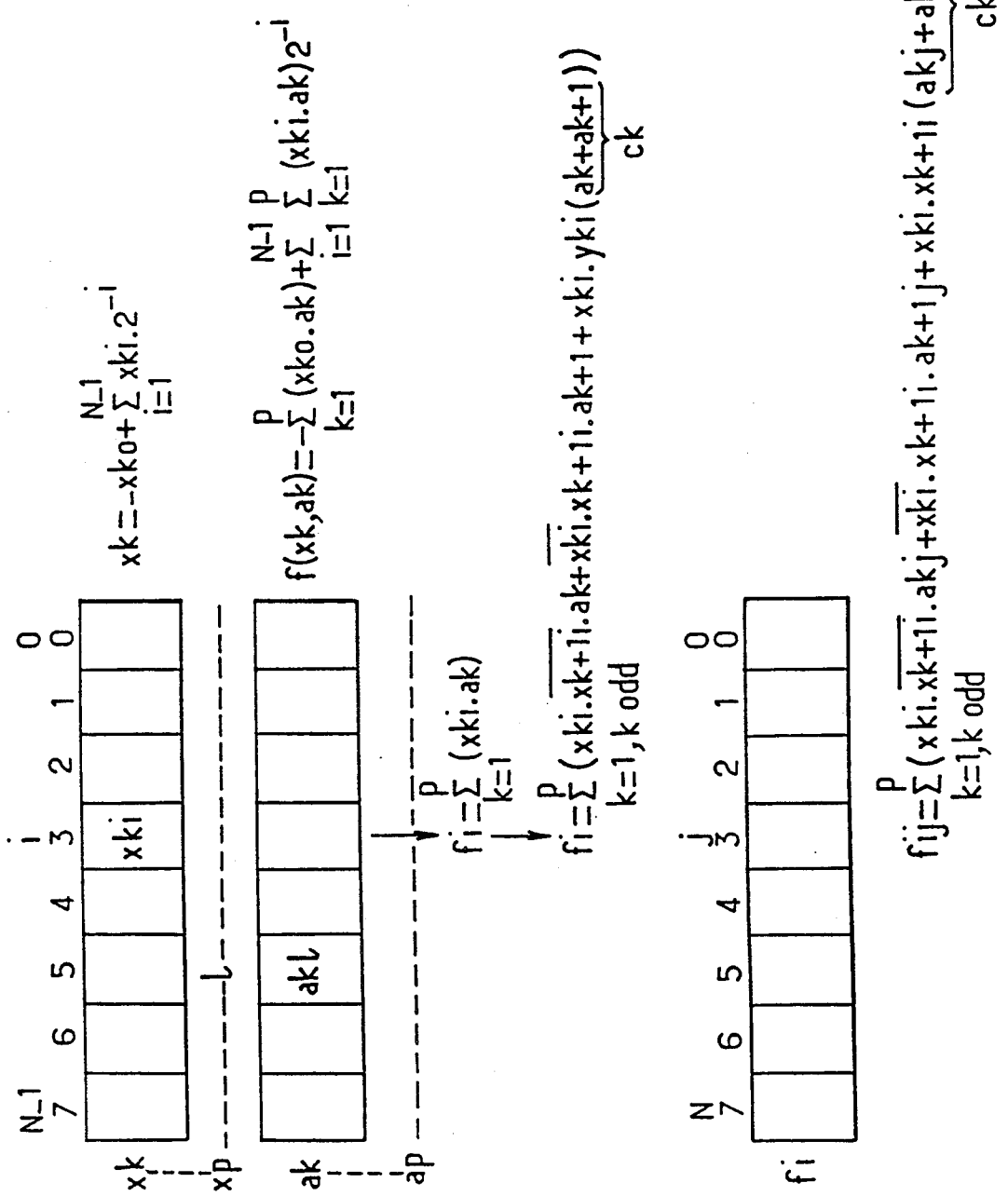
FIG. 1a is a diagram summarizing the general implementation of the method of the invention.

As shown in FIG. 1a, the encoding method of the present invention is applied to a digital signal in order to determine the scalar product of two vectors of the same dimension p.

One of the vectors comprises dedicated components written {ak}, with these components being constant for a given application, while the other vector comprises variable components written {xk}. The components of the two vectors are encoded on N bits, with the bits of the respective components being written 0 to N in FIG. 1a, and with the current bit of each component xk or ak being written i or j respectively and with the values of these bits being written xki or aki, respectively.

The value of the scalar product of the vectors mentioned above is expressed in accordance with the present invention by a scalar product value function written:

$$f(xk,ak) = \sum_{k=1}^{p} ak \cdot xk$$

and the method of the invention, as shown in FIG. 1a, consists in expressing this scalar product value function in the form of partial sums of products fi of binary variables xki, with these binary variables naturally being the values corresponding to each bit of order i on which the above-mentioned components are encoded.

Thus, by way of example, each component xk is expressed in the method of the invention by the equation:

$$xk = -xk0 + \sum_{i=1}^{N-1} xki \cdot 2^{-i}$$

and the scalar product value function then satisfies the equation:

$$f(xk,ak) = -\sum_{k=1}^{p} (xk0 \cdot ak) + \sum_{i=1}^{N-1} \sum_{k=1}^{p} (xki \cdot ak) 2^{-i}$$

Under these conditions, and by identification in accordance with the method of the invention, each product partial sum fi satisfies the equation:

$$fi = \sum_{k=1}^{p} (xki \cdot ak)$$

and takes one of the values of the fixed components ak depending on the values of the above-mentioned binary variables xki having m possible values. It will naturally be understood that m is necessarily a parameter satisfying the relationship:

if $p>2$, $m=2^p-1$ if $p=1$, $m=2$

The method of the present invention then consists in expressing each product partial sum fi at bit level into its elementary partial sums at bit level, written fij, where j designates the order of the bit in each partial sum fi encoded on N bits.

Thus, as shown in FIG. 1a, each partial sum fi satisfies the equation:

$$fi = \sum_{k=1,\text{odd}}^{p} (xki \cdot \overline{xk+li} \cdot ak + \overline{xki} \cdot xk + li \cdot ak + 1 +$$

$$\underbrace{xki \cdot yki\,(ak + ak + 1))}_{ck}$$

On the basis of the above-mentioned expression for each partial sum fi, each elementary partial sum fij at each bit of order j satisfies the relationship:

$$fij = \sum_{k=1,\text{odd}}^{p} (xki \cdot \overline{xk+li} \cdot akj + \overline{xki} \cdot xk + li \cdot ak + 1j +$$

$$\underbrace{xki\,xk + li\,(akj + ak + 1j))}_{ckj}$$

It will thus be understood that each elementary partial sum fij takes one of the values akj, where akj naturally designates the corresponding binary value of order j in the corresponding component ak depending on the values of the above-mentioned binary values xki.

In accordance with the method of the invention, the bit level elementary partial sums fij are then calculated by evaluating a plurality of $2^m$ possibilities by varying the above-mentioned binary values akj, which then makes it possible to calculate each partial sum fi from the bit level elementary partial sums fij, and then to calculate the above-mentioned scalar product value function.

It may be observed that the method of the invention for encoding a digital signal to determine the scalar product of two vectors having the same dimension p is in no way limited to a particular dimension for these vectors. However, the number of operations to be performed increases exponentially as a function of the number of bits on which the components are encoded and as a function of the number of said components, i.e. on the above-mentioned dimension of the vectors.

Mathematical analysis shows that the encoding method of the present invention is advantageously implemented with vectors of small dimension, e.g. p=2, and the method can then be applied simultaneously to subsets of vectors constituting subvectors of the above-mentioned dimension for the purpose of processing vectors of an arbitrary dimension which is a multiple of the above-specified dimension p=2.

In compliance with the above considerations, two examples of how the method of the invention can be implemented are given below by way of non-limiting example and with reference to FIGS. 1b and 1c, respectively.

Figure 1B:
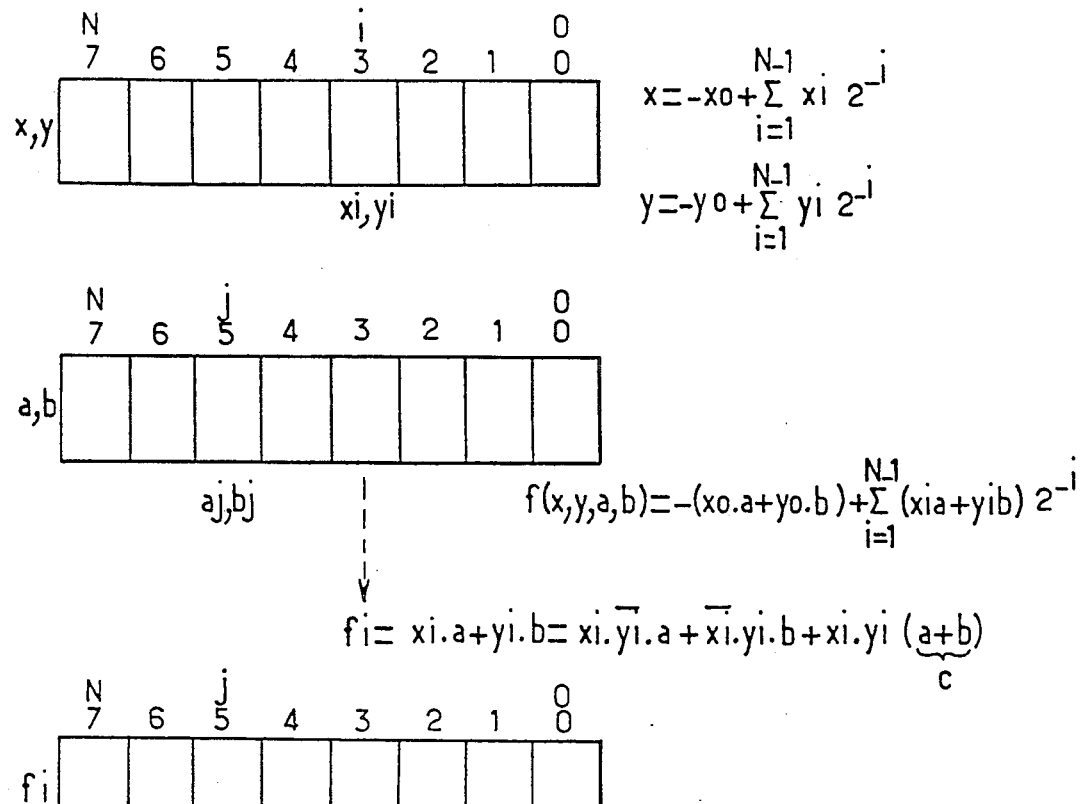
FIG. 1b is a diagram summarizing the method of the invention and more particularly illustrating the encoding method of the invention as applicable to vectors of dimension p=2, and at a rate of one bit per driving clock cycle.

Thus, as shown in FIG. 1b, to perform the calculation on any vector of dimension p=2 or on any vector resulting from components written a, b; x, y with (a1=a, a2=b, and x1=x, x2=y) subsets in a vector space of dimension p greater than 2, the components x,y satisfy the following equations, respectively:

$$x = -x0 + \sum_{i=1}^{N-1} xi \cdot 2^{-i}$$

$$y = -y0 + \sum_{i=1}^{N-1} yi \cdot 2^{-i}$$

In these equations, xi, yi designate the binary values or binary variables that correspond to the variables x,y for rank i of the bits under consideration.

The scalar product value function is then written:

$$f(x,y;a,b) = -(x0 \cdot a + y0,b) + \sum_{i=1}^{N-1} (xi \cdot a + yi \cdot b) 2^{-i}$$

and the partial sums fi satisfy the equation:

$$fi = xi \cdot a + yi \cdot b = xi \cdot \overline{yi} \cdot a + \overline{xi} \cdot yi \cdot b + \underbrace{xi \cdot yi (a + b)}_{c}$$

Each of the elementary patial sums fij at the level of the bit of rank j for each of the bits of order j then satisfies the equation:

$$fij = xi \cdot \overline{yi} \cdot aj + \overline{xi} \cdot yi \cdot bj + xi \cdot yi \cdot \underbrace{(a + b)j}_{cj}$$

In the above equation aj, bj, and cj designate the corresponding binary values for the bits of rank j of the components a or b, or of the parameter c representing the sum a+b.

Thus, each partial sum fi may take four possible values: a, b, c, 0 taking account of the fact that xi and yi are binary variables. Given that a and b are dedicated components, it is then possible in accordance with the method of the invention to calculate c, thereby performing the method.

At bit level, the bit of rank j in each partial sum fi, i.e. each elementary partial sum fij, takes the value aj or bj or cj or 0.

Given the equation specifying each elementary partial sum fij, it is then possible to consider each of said sums as a function of xi, yi for the constants aj, bj, and cj under consideration. Because the constants aj, bj, and cj are binary variables, there exist eight possible values for expressing the elementary partial sums fij, as given in following truth table,

TABLE 1

| aj | bj | cj | fij (xi,yi;aj,bj,cj) |
|---|---|---|---|
| 0 | 0 | 0 | 0 |
| 0 | 0 | 1 | $\underline{x}iyi$ |
| 0 | 1 | 0 | $\overline{x}iyi$ |
| 0 | 1 | 1 | $\underline{y}i$ |
| 1 | 0 | 0 | $xi\overline{y}i$ |
| 1 | 0 | 1 | $xi$ |
| 1 | 1 | 0 | $xi \oplus yi$ |
| 1 | 1 | 1 | $xi + yi$ |

Figure 1D:
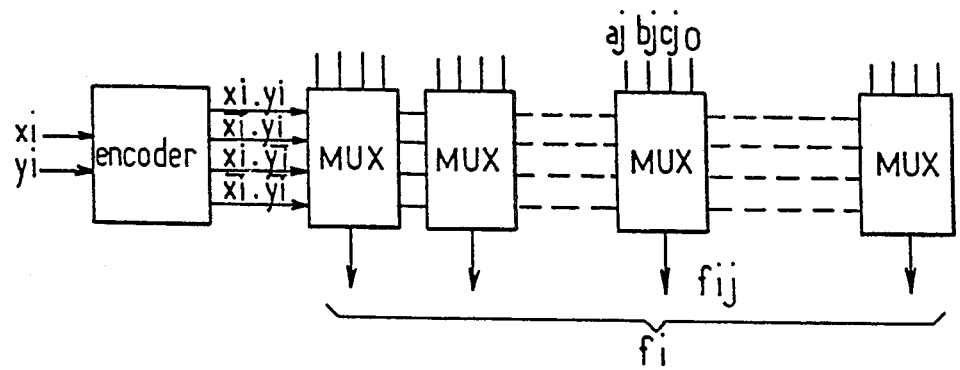
FIGS. 1d and 1e are block diagrams of circuits suitable for implementing the method of the present invention as summarized in FIGS. 1b and 1c, respectively.

It may be observed that in order to implement the method of the invention it is possible to generate the elementary partial sums fij directly by means of an encoding circuit as shown in FIG. 1d, with the encoding circuit including logic circuits suitable for implementing the set of different combinations on the binary values xi, yi, i.e. the products xi.yi, $\overline{xi}$.yi, xi.$\overline{yi}$, and $\overline{xi}$.$\overline{yi}$. Each of the multiplexers receives the corresponding values aj, bj, cj, and 0, and each of them delivers one bit representative of the corresponding elementary partial sum fij, with the partial sum fi then being obtainable by concatenating the bits representative of each elementary partial sum fij.

Whereas the implementation of the method of the invention as described with reference to FIG. 1b is capable of processing one bit per driving clock cycle in the special circuit for implementing the invention as described below, an advantageous second implementation of the encoding method of the present invention makes it possible to process two bits per driving clock cycle by using the modified Booth encoding technique referred to below as MBE encoding, and this implementation is described with reference to FIG. 1c for calculating the scalar product of two vectors of dimension p=1, i.e. for calculating the product of two vectors or for performing a calculation on any vector that results in a component a.x with a1=a and x1=x that is a subset of a vector space of dimension p>1.

In the above-mentioned implementation of the encoding method of the present invention, the component x with x=x1 is assumed to be encoded using a twos complement code and may be expressed in the form:

$$x = 2^{-1} \sum_{\substack{i=0, \\ i \text{ even}}}^{N-1} (-2xi + xi + 1 + xi + 2) 4^{-i}$$

The scalar product evaluation function then satisfies the equation:

$$f(x,a) = x \cdot a = 2^{-1} \sum_{\substack{i=0, \\ i \text{ even}}}^{N-1} (-2xi + xi + 1 + xi + 2) \cdot a \cdot 4^{-i}$$

In the above expression for the evaluation function, it will be observed that the summing over i applies to the even values thereof.

Given the above-mentioned expression for the evaluation function, and by identification, each product partial sum fi is reduced to a partial product on three successive bits of ranks i, i+1, and i+2, and satisfies the equation:

$$fi = (-2xi + xi+1 + xi+2).a$$

It may then be observed that each partial product fi can take the values d=2a, a, 0, −a, −d=−2a as a function of the corresponding binary values xi, xi+1, xi+2, which values naturally correspond to the values of the bits of ranks i, i+1, i+2 in the above-mentioned component x.

Figures 1C, 1E:
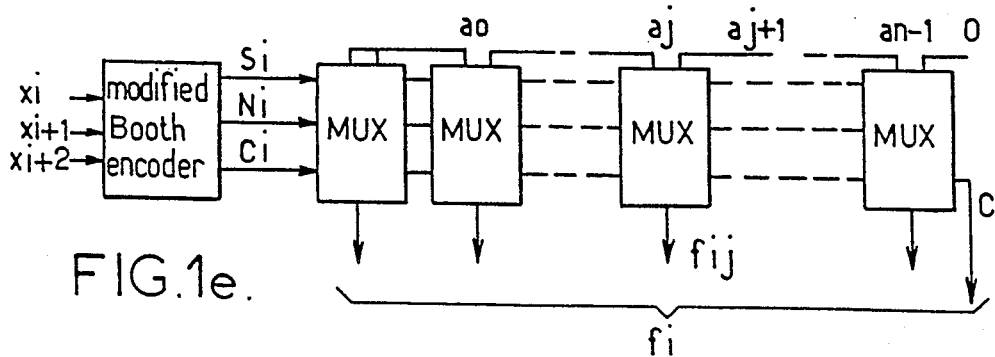
FIG. 1c is a diagram summarizing the implementation of the method of the invention and more particularly illustrating the encoding method of the invention applied to vectors of dimension p=1, with the product of two values being calculated at a rate of two bits per driving clock cycle.

As also shown in FIG. 1c, each partial product fi is expressed at rank j bit level in the form of the bit level elementary product fij. Each bit level elementary product fij satisfies the following equation for each bit of rank j in the corresponding binary values aj, bj of the values a and d:

$$fij = ((\overline{Si}.aj + Si.dj)Ni) \oplus Ci$$

In the above equation, the parameters Si, Ni, and Ci satisfy the following equations, respectively:

$$Si = xi+1 \oplus xi+2$$

$$Ni = \overline{xi.\overline{xi+1}.\overline{xi+2}} + xi.xi+1.xi+2$$

$$Ci = xi$$

In the above equations, it may be observed that Si designates a shift check parameter with the parameter Si being equal to 1 if fi is equal to {−d,d}, else Si=0, Ni designates a non-zero check parameter with Ni=1 if fi={−d,−a,a,d}, else Ni=0, Ci=xi with the parameter Ci designating a complement control parameter such that Ci=1 if fi={−a,−d}, else Ci=0, with the symbol ⊕ designating in conventional manner the EXCLUSIVE OR operation. It may be observed that the expressions given above for Si, Ni, and Ci may be obtained from the following truth table, Table 2.

| xi | xi + 1 | xi + 1 | S(i) Shift | N(i) Non-zero | C(i) Complement |
|---|---|---|---|---|---|
| 0 | 0 | 0 | ? | 0 | ? |
| 0 | 0 | 1 | 0 | 1 | 0 |
| 0 | 1 | 0 | 0 | 1 | 0 |
| 0 | 1 | 1 | 1 | 1 | 0 |
| 1 | 0 | 0 | 1 | 1 | 1 |
| 1 | 0 | 1 | 0 | 1 | 1 |
| 1 | 1 | 0 | 0 | 1 | 1 |
| 1 | 1 | 1 | ? | 0 | ? |

In Table 2, the symbol ? designates an arbitrary state.

FIG. 1e is a block diagram of a circuit for putting into effect the second implementation of the method of the present invention when calculating the product of two vectors using BME encoding.

This circuit includes a modified Booth encoder which delivers the above-described parameters Si, Ni, and Ci on the basis of the bits of ranks i, i+1, and i+2 from the component x, and having the following values respectively xi, xi+1, xi+2. It will naturally be observed that in this case the modified Booth encoder is embodied in the form of conventional type logic circuits for performing the corresponding logic operations that enable the above-mentioned parameters to be defined.

In addition, the circuit as shown in FIG. 1e includes a plurality of multiplexers which also receive the binary variables or bits of order j of the component a, these bits being written aj where j lies in the range 0 to N−1, with each of the multiplexers serving to deliver a respective elementary product fij, and with the partial product fi then being obtained as before for the circuit in FIG. 1d by concatenating the bits delivered by the multiplexers which represent the elementary partial products fij.

A more detailed description of a digital signal encoding circuit for determining the scalar product of two vectors having the same dimension p is given below with reference to FIGS. 2a and 2b which relate respectively to implementing the method of the invention as shown in FIG. 1b and as shown in FIG. 1c. The circuit of the present invention as described below with reference to FIGS. 2a and 2b appears to be particularly advantageous in that by making use of a special encoding circuit, the dedicated encoding circuits make it possible to omit the use of multiplexers as described above with reference to FIGS. 1b and 1c.

Figure 2A:
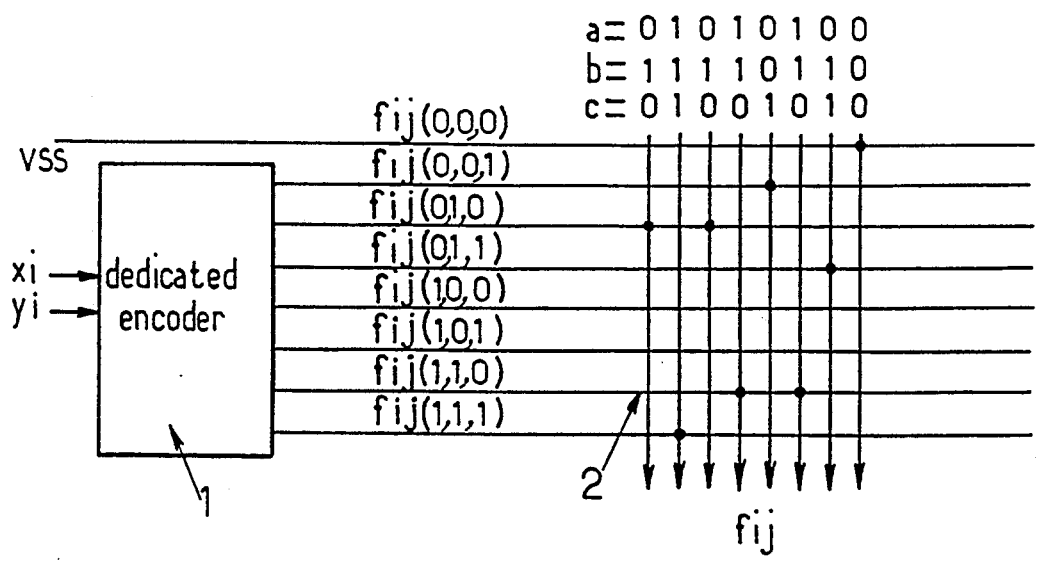
FIGS. 2a and 2b are a diagram of an encoding circuit using the method shown in FIG. 1b in accordance with the present invention.

In general, as shown in FIG. 2a, it may be observed that the circuit comprises a dedicated logic encoding circuit referenced 1 responsive to binary variables xki to generate, for each bit of rank i of the partial sums fj, a plurality of bit level elementary partial sums fij by evaluating a plurality of $2^m$ possibilities by varying the binary values akj of the bits of same rank j of the dedicated component ak.

The encoding circuit of the present invention also includes at least one two-dimensional matrix of dimension $2^m$, N, with this two-dimensional matrix referenced 2 performing an interconnection function causing each bit of rank j in the dedicated components ak to correspond to one value and one value only of the bit level partial sums fij delivered by the dedicated logic encoding circuit 1.

As described above, the set of bit level partial sums fij defines the corresponding partial sum fi by concatenation of the bits representing the corresponding elementary partial sums fij.

In general, it may be observed that the digital signal encoding circuit of the present invention making use of dedicated encoding is particularly advantageous compared with the above-described embodiment of FIGS. 1c and 1d, since by using dedicated encoding in the dedicated logic encoding circuit 1, it is possible to omit the multiplexers which are replaced merely by a two-dimensional matrix of interconnection points, as described below.

A more detailed description of the encoding circuit of the present invention for implementing the method as shown in FIG. 1d is given below with reference to FIGS. 2a and 2b.

In such a case, for any vector of dimension p=2 or for any vector resulting from components a1=a, a2=b, x1=x, and x2=y that are subsets of a vector space of dimension p>2, each bit level elementary partial sum fij for each j order bit satisfies the equation described above.

In that equation, the terms aj, bj, and cj designate the corresponding j order binary values of the above-defined components a, b, and c.

Figure 2B:
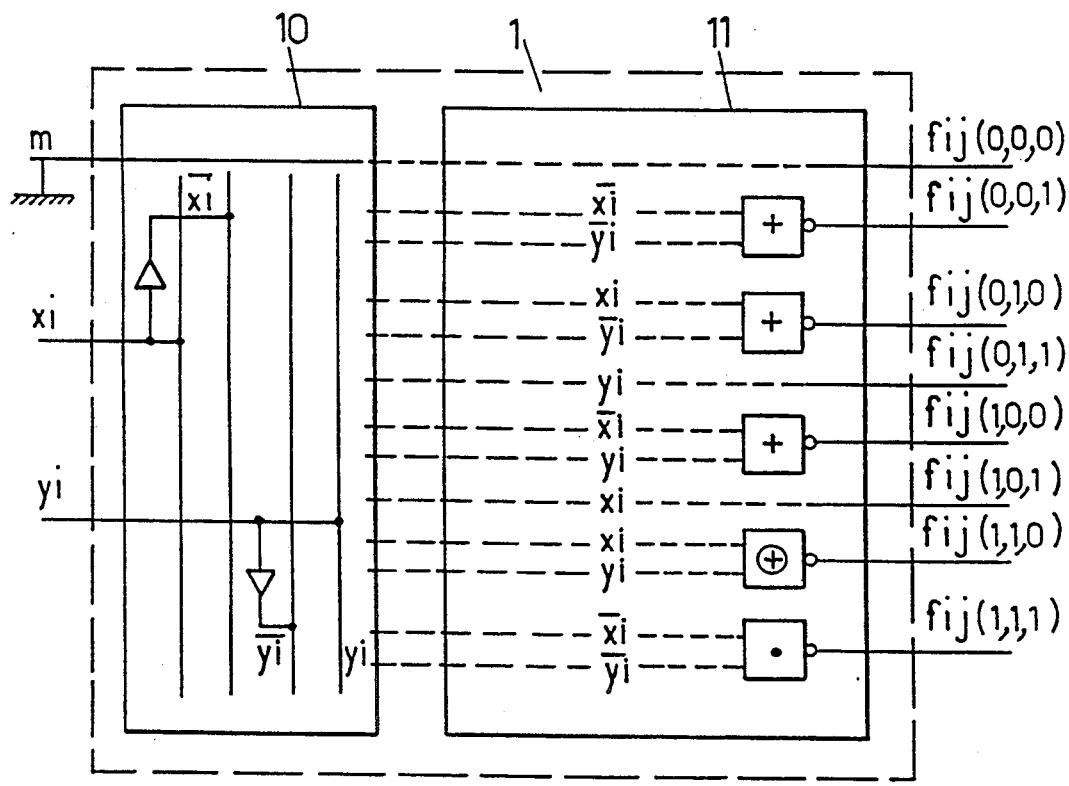

In this case, as shown in FIGS. 2a and 2b, the dedicated logic encoding circuit 1 comprises an input circuit 10 receiving the binary variables xi, yi of rank i of the components x and y. As shown in FIG. 2b, this input circuit comprises two inverters referenced 101 and 102 for generating complemented values $\overline{xi}$, $\overline{yi}$ of the binary values xi, yi. The input circuit 10 delivers the binary variables xi, yi and their complemented values $\overline{xi}$, $\overline{yi}$.

The dedicated logic encoding circuit 1 also includes a plurality of logic gates (given overall reference 11) for generating the $2^m=8$ possible values of the bit level elementary partial sums fij for the values corresponding to the j order binary values of the components a, b, and c. The set of logic gates 11 delivers the corresponding values of the elementary partial sums fij, i.e.:

$fij(0,0,0)=0$ $fij(0,0,1)=xi.yi$ $fij(0,1,0)=\overline{xi}.yi$ $fij(0,1,1)=yi$ $fij(1,0,0)=xi.\overline{yi}$ $fij(1,0,1)=xi$ $fij(1,1,0)=xi.\overline{yi}+\overline{xi}.yi$ $fij(1,1,1)=xi+yi$ It may be observed that the logic gates used in the set of logic gates 11 are essentially constituted by NOR gates or by NAND gates, together with an EXCLUSIVE OR gate.

A more detailed description of an encoding circuit suitable for implementing a method as described above with reference to FIG. 1c is given below with reference to FIGS. 2c and 2d.

It is recalled that in this case, for any vector of dimension p=1, or for any vector resulting in a component a1=a and x1=x subsets in a vector space of dimension p>1, each partial sum fi of a product reduced to a partial product on three successive bits of ranks i, i+1, i+2 of the component x, each corresponding partial product may take the values d=2a, a, 0, −a, −d=−2a as a function of the corresponding binary values xi, xi+1, and xi+2.

Figure 2C:
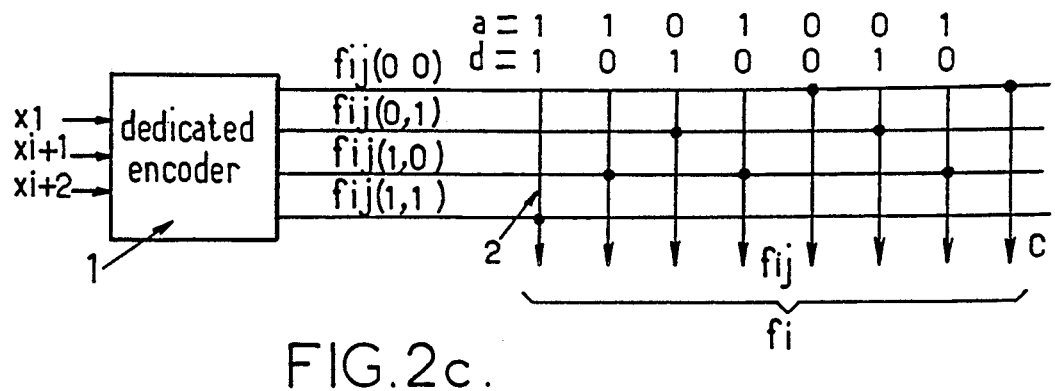
FIGS. 2c and 2d are diagrams of an encoding circuit using the FIG. 1c method in accordance with the present invention.
Figure 2E:
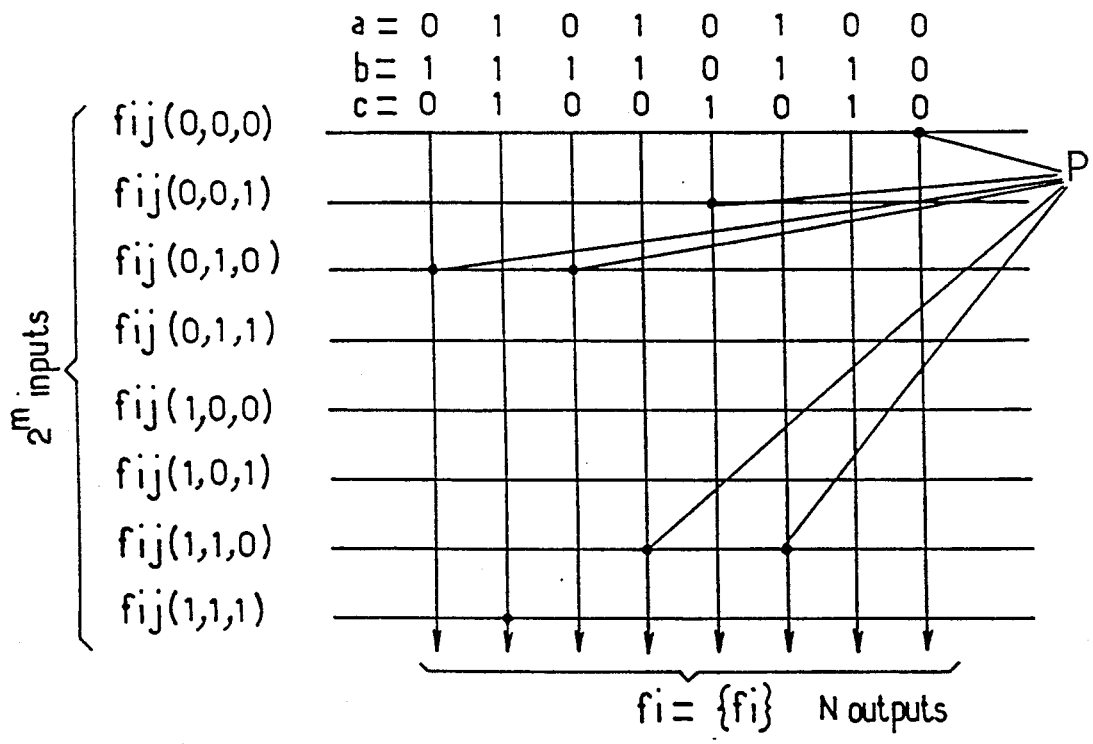
FIG. 2e shows an implementation detail of FIGS. 2a and 2c.
Figure 2D:
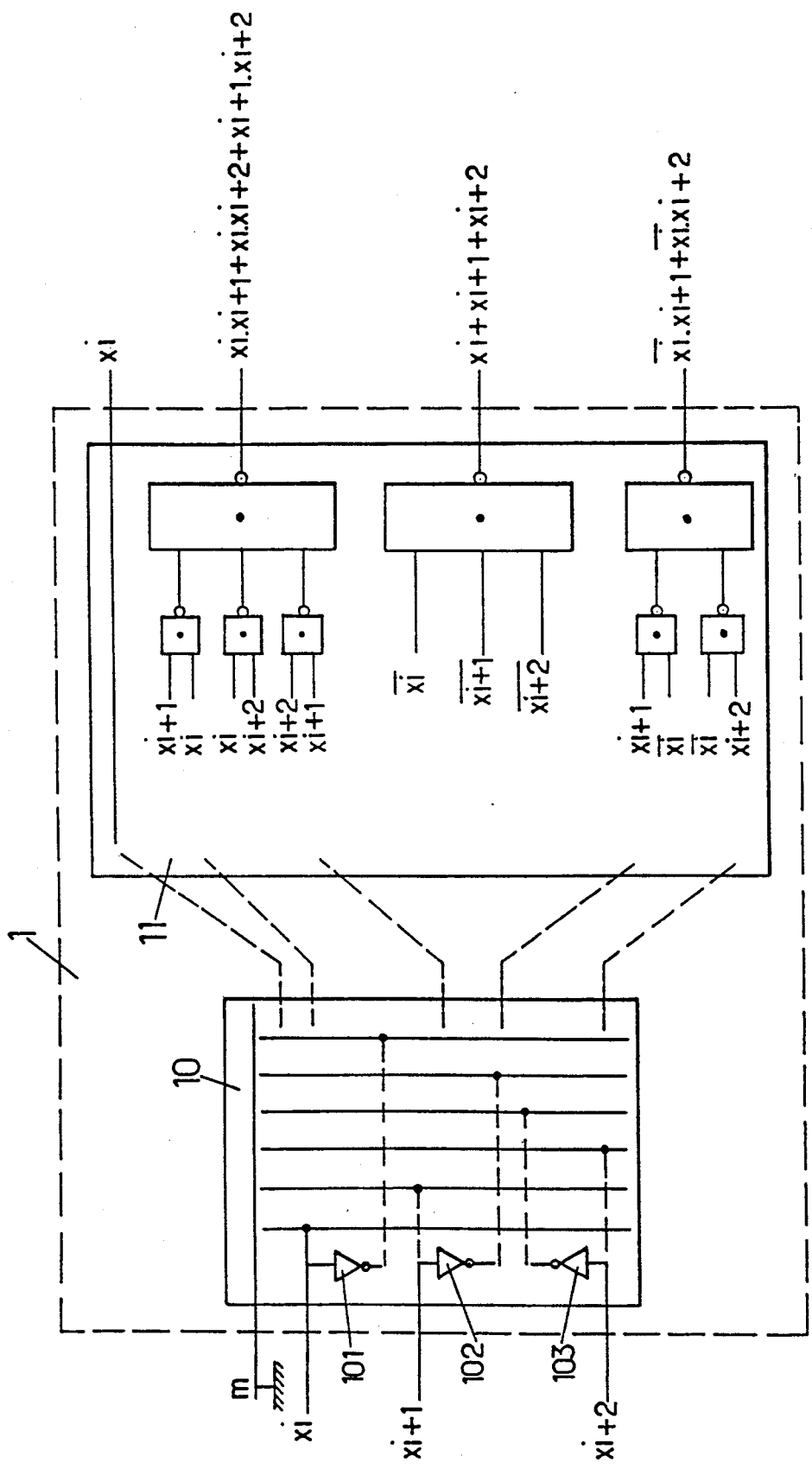

As also shown in FIG. 2d, the dedicated logic encoding circuit 1 in this case likewise includes an input circuit referenced 10 receiving the binary variables xi, xi+1, xi+2 of corresponding rank in the component x, said input circuit including three inverters respectively referenced 101, 102, and 103 for generating the complemented values $\overline{xi}$, $\overline{xi+1}$, and $\overline{xi+2}$ of the binary variables xi, xi+1, and xi+2. The input circuit 10 delivers the above-mentioned binary values and their complemented values.

In addition, the dedicated logic encoding circuit 1 it comprises a plurality of logic gates (given overall reference 11) for generating the $2^m=4$ possible values of the bit level elementary partial sums fij for the corresponding values of the j order binary values of the partial products a and d. The set of logic gates 11 delivers the bit level elementary products fij which can be determined for the values of logic variables aj and bj from the following truth table, given below in Table 3.

| aj | bj | fij(Si,Ni,Ci,aj,bj) | fij(xi,xi + 1,xi + 2; aj,bj) |
|---|---|---|---|
| 0 | 0 | Ci | xi |
| 0 | 1 | (SiNi) ⊕ Ci | xi(xi + 1 + xi + 2) + xi + 1xi + 2 |
| 1 | 0 | (SiNi) ⊕ Ci | xi + xi + 1 + xi + 2 |
| 1 | 1 | Ni ⊕ Ci | xi(xi + 1 + xi + 2) |

It may be observed that the embodiment shown in FIG. 2c is given by way of non-limiting example for a=101001, with the signed value of a being equal to a=1101001, and with the value of d=2a then being equal to 1010010.

It is recalled that in conventional manner for a value a encoded on N bits, the negative value −a satisfies the equation:

$$-a = \overline{a} + 2^{-N+1} = \left(-\overline{a}_0 + \sum_{j=1}^{N-1} a_j 2^{-j}\right) + 2^{-N+1}$$

A more detailed description is given with reference to FIG. 2d of the two-dimensional matrix used in each of the embodiments of the encoding circuit of the present invention as shown in FIG. 2a or FIG. 2c.

In FIG. 2e, the above-mentioned two-dimensional matrix is shown for the non-limiting case of the first embodiment where each of the $2^m$ inputs receives a bit level elementary product or partial sum value fij. The matrix is itself constituted by a programmable mesh network between conductors connected to inputs and conductors connected to the above-mentioned outputs. At a point P in the network, an electrical connection is formed between the corresponding input and output addresses so as to enable each output to correspond to an input of corresponding value. Thus, it will be observed that to obtain the value fij(0,0,0) at the output, the corresponding point P is provided at address a=0 b=0 c=0 as can be seen in FIG. 2d. The same applies for the corresponding points P shown in this figure.

Parts a, b, c, d, and e of FIG. 3 are block diagrams for implementing a device for calculating the scalar product of two vectors of dimension 2 q where q>1.

To this end, and as mentioned above, each vector is subdivided into q subvectors of dimension 2 and each pair of subvectors relating to the dedicated components and to the variable components is then subjected to processing by one of the encoding circuits of the present invention as shown above in FIGS. 2a, 2b, or 2c, 2d to generate a corresponding partial sum referenced ei, fi, gi, or hi, for example. Each of the above-mentioned partial sums is applied to a summing circuit as shown in above-mentioned parts a to e of FIG. 3.

The summing circuit shown in part a of FIG. 3 serves to sum two partial sums fi, fg, and comprises in succession a first carry propagation adder CPA1 followed by a second carry propagation adder CPA2 which is looped through a register whose output is looped back to one of the inputs of the second adder CPA2.

Similarly, part b of FIG. 3 shows an adder for two partial sums fij, which adder is constituted by a first carry save adder referenced CSA1 receiving the above-mentioned two partial sums and followed by a second carry save adder CSA2, which adder is coupled to first and second sum registers, with the second sum register being looped back both to the first carry save adder CSA1 and to the second carry save adder CSA2. Two output registers and a summing circuit in series serve to deliver the result of summing the partial sums fi, gi. It may be observed that the first output summing circuit stores one of the outputs of the second carry save adder CSA2, while the second sum register stores the other output therefrom.

Parts c, d, and e of FIG. 3 show an implementation of a partial sum summing circuit for summing four elementary partial sums fi, gi, hi, and ei. In part c, these summing circuits are constituted by means of carry propagation adders, with three carry propagation adders CPA1, CPA2, and CPA3 in cascade having the above-mentioned partial sums applied thereto, together with a fourth carry propagation adder CPA4 coupled to an output register which is looped back on the fourth adder CPA4, in a manner similar to that shown in part a of FIG. 3. In contrast, in parts d and e of FIG. 3, the summing circuits are made up of an input circuit constituted by three carry save adders referenced CSA1, CSA2, and CSA3 whose inputs receive the above-mentioned partial sums, followed in a manner analogous to that shown in part b of FIG. 3 by a carry save adder CSA4 coupled to first and second sum registers and then to two output registers 3 and 4. It may be observed in part e of FIG. 3 that the three carry save adders CSA1, CSA2, and CSA3 are connected in a tree structure whereas in part d of FIG. 3 they are connected in cascade. It may also be observed that the summing circuits shown in parts a to e of FIG. 3 constitute word level summing circuits for the partial sums fi, gi, hi, and ei.

Figure 4A:
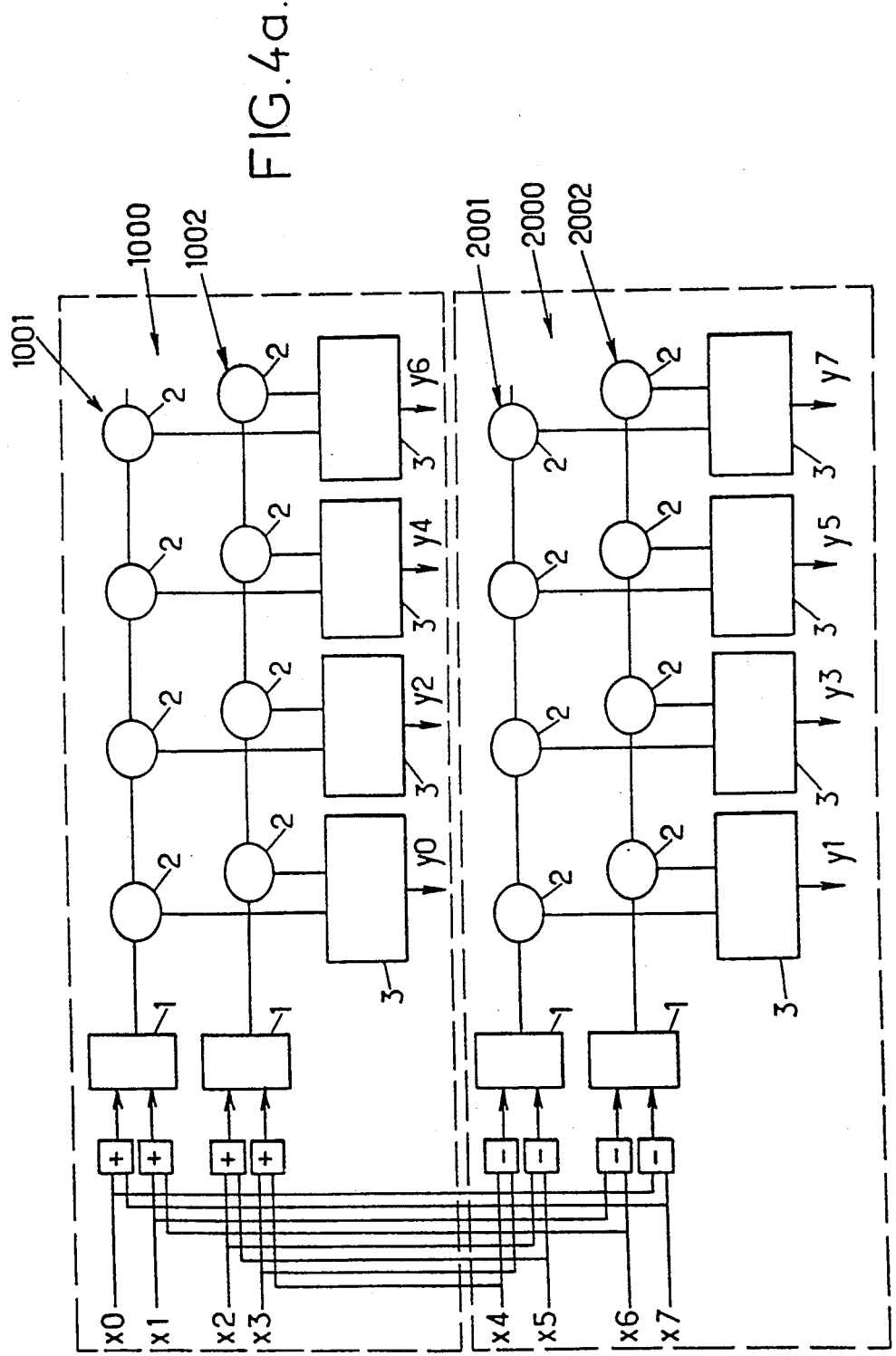
FIG. 4a is a block diagram of a system for processing digital image data by the discrete cosine transform DCT, with the coefficients of the DCT matrix acting as the dedicated components $\{ak\}_1^p$ of the method of the invention as described with reference to FIG. 1b.
Figure 4B:
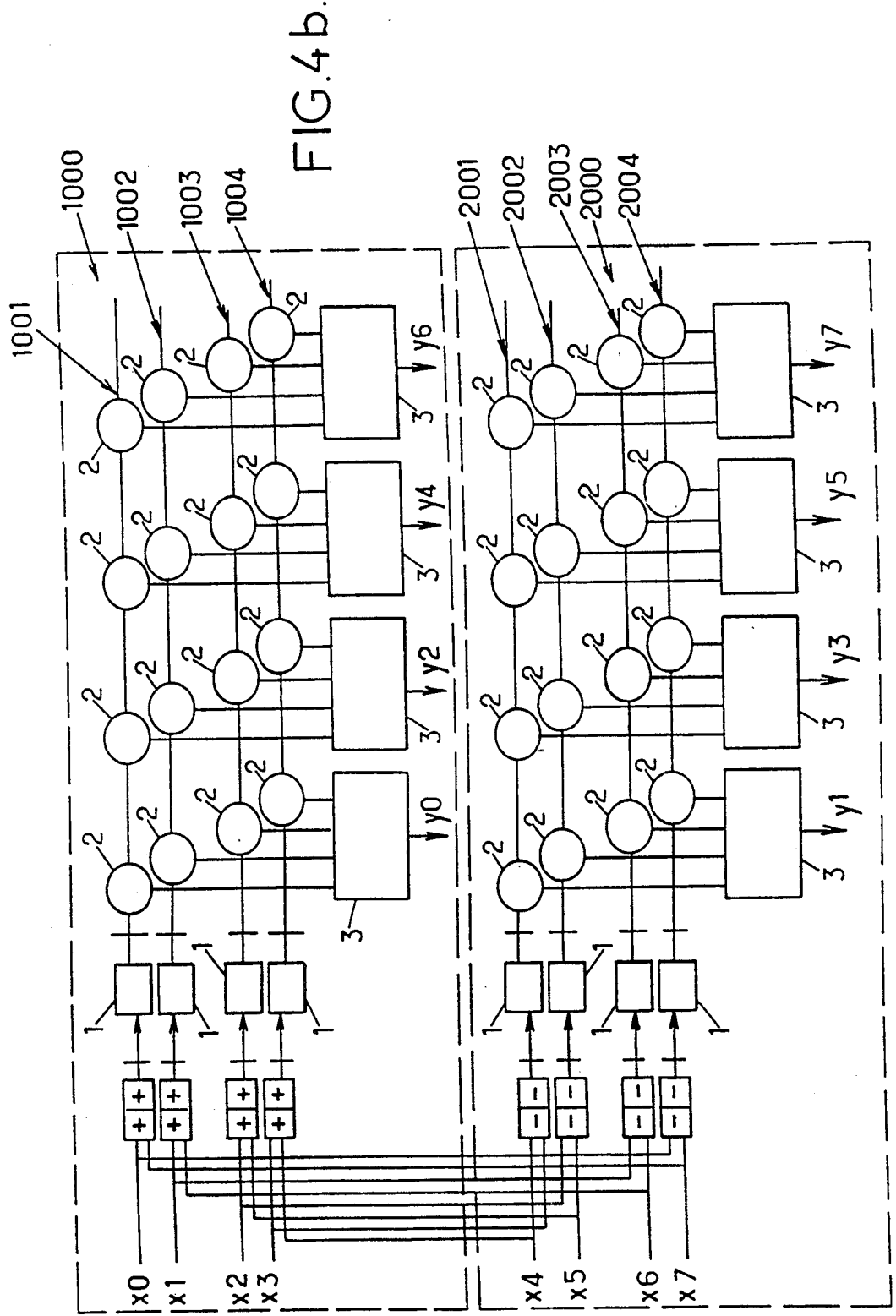
FIG. 4b is a block diagram of a system for processing digital image data by the discrete cosine transform DCT, with the coefficients of the DCT matrix acting as the dedicated components $\{ak\}_1^p$ of the method of the invention as described with reference to FIG. 1c.

With reference to FIGS. 4a and 4b a more detailed description is given of an embodiment of a data processing circuit for obtaining a discrete cosine transform (written DCT) by performing the product of a matrix of dimension n×p and a vector of dimension p by means of the encoding circuit of the present invention as shown in FIG. 2a or FIG. 2b.

Heretofore, discrete cosine transform (DCT) processing has been applied to compressing data in real time or to encoding images, for example. Because of the increasing interest in applying these types of processing to video signal processing, there is a need for very fast integrated circuit for performing discrete cosine transform processing in order to meet the required performance levels.

At present, a large number of integrated circuits for discrete cosine transform processing have been proposed, e.g. by the following companies: Inmos, SGS-Thomson, and Matra Harris. So far, the highest driving clock rate for performing such calculation to be announced is 27 MHz.

The present application of the encoding circuit of the present invention is constituted by a very large scale integration (VLSI) type integrated circuit for performing DCT processing. In particular, the circuit of the present invention makes it possible to achieve speeds which are much higher even though the integrated circuit area required for providing such processing is reduced.

Such a use is essentially based on a direct application of the dedicated encoding circuit of the present invention. Naturally, as described above, the DCT processing integrated circuit is based on the application of a constant coefficient transformation matrix for a constant transformation length. Consequently, and in accordance with the present invention, the logical design of the set of circuits is simplified. It will also be observed that the use of carry save adders makes it possible to improve calculation speeds greatly, as described below.

It is recalled that discrete cosine transformation (DCT) processing of length N is defined by the following equation:

$$y_k = \sum_{i=0}^{N-1} x_i C_k \cos \frac{2\pi}{4N} (2i+1)k; \text{ for } k = 0,1,\ldots,N-1$$

where:
$C_0 = 1/\sqrt{2}$ and $C_i = 1$ for other i.

In accordance with a general aspect of implementing the discrete cosine transform circuit of the present invention, and as shown in FIGS. 4a or 4b, the encoding circuits of the present invention are organized to constitute a first path referenced 1000 for processing the sum of the variable components of ranks r and s, i.e. the components xr and xs, where r+s=p, and a second path referenced 2000 for processing the difference of the variable components of ranks r and s where r+s=p.

Each of the first and second processing paths 1000 and 2000 is subdivided into a plurality of elementary paths each formed by an encoding circuit of the present invention. In addition, the output from a network 2 constituting the two-dimensional matrix of the encoding circuit of the invention in each elementary path is interconnected to a summing circuit 3, i.e. one of the summing circuits described above with reference to FIG. 3.

A more specific application of discrete cosine transform processing of length 8 is now described with reference to FIGS. 4a and 4b.

In general, a discrete cosine transform of length 8 can be expressed by the following transformation product:

$$\begin{bmatrix} y_0 \\ y_2 \\ y_4 \\ y_6 \end{bmatrix} = \begin{bmatrix} \cos 4\theta & \cos 4\theta & \cos 4\theta & \cos 4\theta \\ \cos 2\theta & \cos 6\theta & -\cos 6\theta & -\cos 2\theta \\ \cos 4\theta & -\cos 4\theta & -\cos 4\theta & \cos 4\theta \\ \cos 6\theta & -\cos 2\theta & \cos 2\theta & -\cos 6\theta \end{bmatrix} \begin{bmatrix} x_0 + x_7 \\ x_1 + x_6 \\ x_2 + x_5 \\ x_3 + x_4 \end{bmatrix}$$

$$\begin{bmatrix} y_1 \\ y_3 \\ y_5 \\ y_7 \end{bmatrix} = \begin{bmatrix} \cos \theta & \cos 3\theta & \cos 5\theta & \cos 7\theta \\ \cos 3\theta & \cos 9\theta & -\cos 15\theta & -\cos 21\theta \\ \cos 5\theta & -\cos 15\theta & -\cos 25\theta & \cos 35\theta \\ \cos 7\theta & -\cos 21\theta & \cos 35\theta & -\cos 49\theta \end{bmatrix} \begin{bmatrix} x_0 - x_7 \\ x_1 - x_6 \\ x_2 - x_5 \\ x_3 - x_4 \end{bmatrix}$$

It is merely recalled that this expression is entirely general in nature for a discrete cosine transform of length M which may be calculated by the two above-mentioned products of two MxN matrices multiplied by respective vectors of length or dimension M.

This expression leads to a saving in the number of multiplications and additions that are required to calculate the transform. As can be observed from the description below, one result of this expression is to simplify the design of the processing circuits as shown in FIGS. 4a and 4b.

As shown in FIG. 4b in particular, each elementary path 1001, 1002 of the first path 1000 includes two summing circuits in parallel receiving the variable components x0, x7; x1, x6 and x2, x5; x3, x4 respectively, together with a circuit having four programmable arrays referenced 1, 2, 2, 2, 2; with the structure of this circuit naturally corresponding to the structure of the circuit described above with reference to FIG. 2a.

Naturally, in each circuit, each programmed array corresponds to the dedicated components constituted by the p/2 row components of the calculation submatrices. Thus, from the operational point of view, this reduces to calculating the scalar product of one row of each matrix constituting a vector of dedicated components multiplied by input values or components x0 to x7 combined and given above in the calculation equation.

In addition, each elementary path 2001 and 2002 of the second path 2000 includes two parallel subtractors receiving the variable components x4, x3; x2, x5 and x1, x6; x0, x7 respectively and a circuit having four programmed arrays and likewise referenced 1, 2, 2, 2, 2; with each programmed array corresponding to the dedicated components constituted by the p/2 row components of the calculation submatrices.

Finally, each of the first and second paths 1000 and 2000 includes p/2=4 respective summing circuits 3 whose inputs receive the outputs from corresponding ones of the programmed arrays 2 in the corresponding elementary paths.

In the embodiment shown in FIG. 4a, and when processing one bit per cycle, the scalar product evaluation functions for vectors of dimension 2 are written:

$$f = x.a + y.b \text{ and}$$

$$g = z.c + w.d$$

It will naturally be understood that the two scalar product evaluation functions correspond, in fact, to taking account of two subsets of coefficients from the first row of above-described matrix A or B in association with the values of the combined variable components x0 to x7, for example.

The scalar product evaluation function is then written:

$$S = f + g = -(f_0 + g_0) + \sum_{i=0}^{N-1} (f_i + g_i) 2^{-i}$$

In this equation, it is recalled that fi and gi represent the partial sums delivered by the arrays 2 in the first and second elementary paths respectively 1001 & 2002 and 1002 & 2002 of the processing paths 1000 and 2000.

Each product of a subvector and the variable components corresponding to the results y0, y2, y4 & y6 and y1, y3, y5 & y7 respectively is obtained via a summing circuit 3 such as that shown in part a or b of FIG. 3. It will naturally be observed that the programmed arrays 2 are programmed as a function of the corresponding coefficients which represent the values of the dedicated components.

The implementation of the discrete cosine transform (DCT) processing circuit as shown in FIG. 4b differs in that it relates to processing two bits per cycle. In this case, and in accordance with the implementation of the method of the invention as shown in FIG. 1c and the corresponding encoding device as shown in FIG. 2b, the scalar product evaluation function may be written:

$$S = f + g + h + e = 2^{-1} \sum_{\substack{i=0; \\ i \text{ even}}}^{N-1} (f_i + g_i + h_i + e_i) 4^{-i}$$

It may be observed that in the above equation, fi, gi, hi, and ei represent the partial sums of the subvectors f, g, h, and e.

As shown in above-mentioned FIG. 4b, each elementary path of the first path 1000 comprises four elementary paths 1001 to 1004, with each elementary path including two summing circuits in cascade respectively receiving the variable components x0, x7; x1, x6 and x2, x5; x3, x4. The abovementioned summing circuits in cascade deliver three bits of successive ranks in parallel relating to the corresponding sums x0+x7, x1+x6, x2+x5, and x3+x4. In addition, each elementary path includes a circuit constituted by four programmed arrays 1, 2, 2, 2, 2; with each programmed array 2 corresponding to the dedicated components constituted by the p/2 row components of the submatrices in the calculation.

Likewise, the second path 2000 comprises four elementary paths 2001 to 2004 each comprising two subtractors in cascade delivering three bits in parallel of successive ranks relating to the corresponding differences x4−x3, x5−x2, x1−x6, and x7−x0. Each of the above-mentioned elementary paths also includes a circuit comprising four programmed arrays 1, 2, 2, 2, 2; with each programmed array corresponding to the dedicated components constituted by the p/2 row components of the submatrices in the calculation. In addition, and similarly to the embodiment shown in FIG. 4a, each of the first and second paths 1000 and 2000 comprises p/2=4 summing circuits 3 whose inputs receive the outputs from a corresponding one of the programmed arrays in each of the elementary paths.

It may be observed that the DCT processing circuit configurations as shown in FIGS. 4a and 4b may naturally be applied to DCT processing circuits of larger size. A particularly advantageous situation lies in DCT processing of length 16. In conventional manner, processing is performed at one bit per driving clock cycle. In this case, a configuration similar to that shown in FIG. 4 may be used. Given that each input corresponds to a scalar product of dimension 8, it is necessary to use a 4-input summing circuit. A total of 16 4-input summing circuits and 8 dedicated encoding circuits is required. More generally, in the present invention, for performing discrete cosine transform processing of length 2M, 2M summing circuits having M/2 inputs each and M dedicated encoding circuits are required for processing one bit per cycle.

Finally, it may be observed that processing two bits per driving clock cycle is advantageous when the internal precision to which the DCT calculation is performed is greater than the transformation length.

In this case it becomes possible to use a configuration such as that shown in FIG. 4b. For a DCT transform of length 2M, 2M summing circuits having M inputs each and 2M dedicated encoding circuits are then required.

A particularly high performance dedicated encoding method and circuit have thus been described for application to a digital signal to determine the scalar product of two vectors. Implementation of the method gives rise to a significant reduction in the amount of hardware required. Such hardware saving associated with the use of carry save adders also makes it possible to reduce the critical path length followed by the data that is being processed, thereby significantly increasing calculation speed.

Because of the gain in processing speed compared with conventional type processor circuits, the dedicated encoding method and circuits of the invention appear to be particularly well suited to processing digital image data and also to compressing digital data.

We claim:

1. A circuit for encoding a digital signal to determine the scalar product value of two vectors of the same dimension p, one of said vectors, $\{ak\}_1^p$ including dedicated components of determined value and the other vector $\{xk\}_1^p$ including variable components, said dedicated and variable components being encoded on N bits, said scalar product value being expressed in the form of encoded partial sums $f_i$ of binary variables $xk_i$, $xk_i$ designating the binary value of the bit of order i of said variable components xk and each of said encoded partial product sums $f_i$ being expressed at the bit level as an encoded elementary partial sum $f_{ij}$ for each bit of order j, wherein i and j are integers in the range 0 to N−1, each encoded elementary partial sum expressed as the product $xk_i.ak_j$ taking one of the binary values $ak_{ij}$, where $ak_j$ designates the binary values of the bit of order j of said dedicated component ak, said circuit comprising:

a logical encoding circuit for receiving as inputs said binary values of the bit of order i of said variable components, and for generating a logical combination of said binary values of order i; and a plurality of N multiplexers, each of said multiplexers of order j including one input for receiving said logical combination of said binary values of order i of said variable component and a further input for receiving said binary values of order j of said dedicated component, together with a zero value, and each of said multiplexers delivering a corresponding partial sum $f_{ij}$, said partial sum $f_i$ being obtained by concatenating each of said elementary partial sums $f_{ij}$.

2. A circuit as claimed in claim 1, wherein for vectors of dimension p=2, said one vector includes dedicated components $a_1=a$, $a_2=b$ and said other vector includes variable components $x_1=x$, $x_2=y$, said encoded partial sums $f_i$ being expressed in the form $$f_i = x_i a + y_i b = x_i \bar{y}_i a + \bar{x}_i y_i b + y_i.(c)$$

with $c=a+b$, and said elementary partial sums $f_{ij}$ at the level of the bit of rank j being expressed in the form $$f_{ij} = x_i a_j + y_i b_j = x_i \bar{y}_i a_j + \bar{x}_i y_i b_j + x_i y_i.(c)_j$$

where $c_j=(a+b)_j$, $a_j,b_j,c_j$ designating corresponding binary values of order j of said dedicated components a, b and the sum of said components a and b, said logical encoding circuit includes means for generating the products $$x_i y_i, \bar{x}_i y_i, x_i \bar{y}_i \text{ and } \bar{x}_i \bar{y}_i$$

of the binary values of the bit of order i of said variable components x, y so as to form said logical combination, each multiplexer including an input for receiving the corresponding values $a_j$, $b_j$. $c_j$ and said zero value and an output for delivering one bit representative of the corresponding elementary partial sum $f_{ij}$.

3. A circuit as claimed in claim 1, wherein for vectors of dimension p=1, said one vector includes one dedicated component $a_1=a$ and said other vector includes one variable component $x_1=x$, said variable component being encoded using a two complements code and said partial sum $f_i$ being expressed as $f_i=(-2x_i+x_{i+1}+x_{i+2}).a$, where i, i+1, i+2 designate bit orders of successive binary variables of said variable component x, said logical encoding circuit comprising a modified Booth encoder for receiving said successive binary variables of said variable component, and for generating and delivering to said multiplexers:

a shift check parameter $S_i$ expressed as a logical combination of the form $$S_i = x_{i+1} \oplus x_{i+2},$$

a non-zero check parameter $N_i$ expressed as a logical combination of the form $$N_i = \bar{x}_i.\overline{x_{i+1}}.\overline{x_{i+2}} + x_i.x_{i+1}.x_{i+2}, \text{ and}$$

a complement control parameter $C_i$ expressed as a logical combination of the form $C_i = x_i$, each multiplexer of order j receiving said binary variable $a_j$ of order j of said dedicated component so as to deliver a corresponding elementary partial sum $f_{ij}$.

4. A circuit for encoding a digital signal to determine the scalar product value of two vectors of the same dimension p, one of said vectors, $\{ak\}_1^p$ including dedicated components of determined value and the other vector $\{xk\}_1^p$ including variable components, said dedicated and variable components being encoded on N bits, said scalar product value being expressed in the form of encoded partial sums $f_i$ of binary variables $xk_i$, $xk_i$ designating the binary value of the bit of order i of said variable components xk and each of said encoded partial product sums $f_i$ being expressed at the bit level as an encoded elementary partial sum $f_{ij}$ for each bit of order j, wherein i and j are integers in the range 0 to N−1, each encoded elementary partial sum expressed as the product $xk_i.ak_j$ taking one of the binary values $ak_{ij}$, where $ak_j$ designates the binary values of the bit of order j of said dedicated component ak, said circuit comprising:

dedicated logic encoding means for generating a plurality of said encoded elementary partial sums $f_{ij}$ on the basis of said binary values $xk_i$ of said variable components xk, by evaluating $2^m$ possibilities wherein $m=2^p-1$ if $p\geq 2$ or $m=2$ if $p=1$, by varying the binary values $ak_j$ of the bits of the same order j of the said dedicated component ak, and at least one two-dimensional interconnection matrix of dimension $2^m N$, said at least one matrix having an input for receiving said encoded elementary partial sums $f_{ij}$ and an input for receiving said binary values $ak_j$ of the bits of the same order j of said dedicated components, and the at least one matrix comprising electrical connections causing each of said binary values of rank j of said dedicated components to correspond to one value and to one value only of said bit level encoded elementary partial sums $f_{ij}$, said sum $f_i$ being obtained by concatenating each of said elementary partial sums.

5. A circuit as claimed in claim 4 wherein for vectors of dimensions p=2, one of said vectors including dedicated components $a_1=a$, $a_2=b$, and said other vector including variable components $x_1=x$, $y_2=y$, said encoded partial sums $f_i$ being expressed in the form $$f_i = x_i a + y_i b = x_i \bar{y}_i a + \bar{x}_i y_i b + y_i c$$

with $c=a+b$, and said elementary partial sums $f_{ij}$ at the level of the bits of order j being expressed in the form $$f_{ij}=x_i a_j+y_i b_j=x_i \bar{y}_i a_j+\bar{x}_i y_i b_j+x_i y_i c_j$$

where $c_j=(a+b)_j$, $a_j$, $b_j$, $c_j$ designating corresponding binary values of order j, of said dedicated components and the sum thereof respectively, said dedicated logic encoding means comprising:

an input circuit having an input for receiving said binary values $x_i$, $y_i$ or order i of said variable components x, y, said input circuit comprising two inverters for generating complemented values $\bar{x}_i$, $\bar{y}_i$ of said binary values $x_i$, $y_i$, said input circuit having an output for delivering said binary values $x_i$, $y_i$ and said complemented values $\bar{x}_i, \bar{y}_i$, a plurality of logic gates, said logic gates comprising NOR and NAND gates for receiving said binary values $x_i, y_i$ and said complemented values $\bar{x}_i, \bar{y}_i$ and for delivering said corresponding encoded elementary partial sums $f_{ij}$.

6. A circuit as claimed in claim 4 wherein for vectors of dimension p=1, one of said vectors including a dedicated component $a_1=a$ and said other of said vectors including a variable component $x_1=x$, said variable component being encoded using a two complements code and said partial sum $f_i$ being expressed as $f_i=(-2x_{i+}x_i+1+x_i+2)$.a where i, i+1, i+2 designate integer bit orders of binary values of said variable component x, said dedicated encoding circuit comprises:

an input circuit having an input for receiving said binary values $x_i$, $x_{i+1}$, $x_{i+2}$ of corresponding order of said variable component x, said input circuit including three inverters for generating complemented values $\bar{x}_i$, $\overline{x_{i+1}}$, $\overline{x_{i+2}}$ of said binary values and an output for delivering said binary values and said complemented binary values, and a plurality of logic gates for receiving said binary values and said complemented binary values and for delivering the corresponding values of said elementary partial sums $f_{ij}$.

7. A circuit as claimed in claim 4 in which said two dimensional matrix comprises a programmable mesh network connected between conductors connected to the input of said matrix and conductors connected to its output, an electrical connection being formed between an input and an output so as to enable each output to correspond to an input of corresponding value.

8. Apparatus for calculating the scalar product of two vectors of dimension 2q, with q>1, wherein each vector is subdivided into q subvectors of dimension 2, said apparatus comprising a plurality of circuits each comprising a circuit for encoding a digital signal to determine the scalar product value of two vectors of the same dimension p, one of said vectors, $\{ak\}_1^p$ including dedicated components of determined value and the other vector $\{xk\}_1^p$ including variable components, said dedicated and variable components being encoded on N bits, said scalar product value being in the form of encoded partial sums $f_i$ of binary variables $xk_i$, $xk_i$ designating the binary value of the bit of order i of said variable components xk and each of said encoded partial product sums $f_i$ being expressed at the bit level as an encoded elementary partial sum $f_{ij}$ for each bit of order j, wherein i and j are integers in the range 0 to N−1, each encoded elementary partial sum expressed as the product $xk_i.ak_j$ taking one of the binary values $ak_{ij}$, where $ak_j$ designates the binary values of the bit of order j of said dedicated component ak, said circuit comprising:

dedicated logic encoding means for generating a plurality of said encoded elementary partial sums $f_{ij}$ on the basis of said binary values $xk_i$ of said variable components xk, by evaluating $2^m$ possibilities wherein $m=2^p-1$ if $p\geq 2$ or m=2 if p=1, by varying the binary values $ak_j$ of the bits of the same order j of the said dedicated component ak, and at least one two-dimentional interconnection matrix of dimension $2^m N$, said at least one matrix having an input for receiving said encoded elementary partial sums $f_{ij}$ and an input for receiving said binary values $ak_j$ of the bits of the same order j of said dedicated components, and the at least one matrix comprising electrical connections causing each of said binary values of rank j of said dedicated components to correspond to one value and to one value only of said bit level encoded elementary partial sums $f_{ij}$, and said sum $f_i$ being obtained by concatenating each of said elementary partial sums, one of said circuits using each pair of subvectors relating to dedicated components and to variable components to generate a corresponding partial sum ei, fi, gi, hi, and said apparatus further comprising summing means for receiving and summing together each partial sum ei, fi, gi, hi.

9. Apparatus according to claim 8, wherein said apparatus is adapted to perform a discrete cosine transform by multiplying a matrix of dimensions (nxp) by a vector of dimension p, said plurality of circuits being arranged so as to constitute:

a first channel for processing the sum of the variable components of ranks r and s where r+s=p; and a second channel for processing the differences of the variable components of ranks r and s where r+s=p, each of the first and second channels being subdivided into a plurality of elementary channels formed by one of said circuits, the outputs from an array forming a two-dimensional matrix of said circuit constituting each elementary channel being interconnected with a summing circuit of said summing means.

10. Apparatus according to claim 9, wherein said apparatus is adapted to process a vector of dimension p=8 at a rate of one bit per clock cycle, each elementary channel on the first path including:

two parallel summing circuits receiving the variable components x0,x7; x1,x6 and x2,x5; x3,x4, respectively;

a circuit having four programmed arrays, each programmed array corresponding to the dedicated components constituted by the p/2 row components of the submatrices in the calculation; and each elementary path of the second channel including:

two parallel substractors receiving the variable components x4,x3; x2,x5; and x1,x6; x0,x7, respectively; and a circuit having four programmed arrays, each programmed array corresponding to the dedicated components constituted by the p/2 row components of the calculation submatrices;

said first and second channels each including p/2=4 summing circuits each having its inputs connected to the outputs from one of the programmed arrays of each of the elementary channels of the corresponding path.

11. Apparatus according to claim 9, wherein said apparatus is adapted to process a vector of dimension of p=8 at a rate of 2 bits per clock cycle, each elementary channel of the first channel which comprises four elementary paths including two summing circuits in cascade receiving the variable components x0,x7; x1,x6 and x2,x5; x3,x4 respectively, said summing circuits in cascade delivering three bits of successive ranks in parallel relating to the corresponding sums x0+x7; x1+x6; x2+x5; and x3+x4, and a circuit having four programmed arrays, each programmed array corresponding to dedicated components constituted by the p/2 row components of the calculation submatrix;

each elementary channel of the second channel which comprises four elementary channels including:

two substractors in cascade delivering three bits of successive ranks in parallel relating to the corresponding differences x4-x3, x5-x2; x1-x6; x7-x0; and a circuit having four programmable arrays, each programmable array corresponding to dedicated components constituted by p/2 components of the rows of the calculation submatrices; and said first and second channels each including p/2=4 summing circuits whose inputs receive the outputs from one of the programmed arrays in each of the elementary channels of the corresponding channel.

* * * * *